United States Patent
Stark et al.

(10) Patent No.: US 6,709,273 B2
(45) Date of Patent: Mar. 23, 2004

(54) ELECTRONIC KEYBOARD INSTRUCTOR

(76) Inventors: Jeffrey Stark, 1563 Rialto La., Davis, CA (US) 95616; Joel Stark, 1555 Lyle La., Paso Robles, CA (US) 93446

( * ) Notice: Subject to any disclaimer, the term of this patent is extended or adjusted under 35 U.S.C. 154(b) by 54 days.

(21) Appl. No.: 09/419,383

(22) Filed: Oct. 15, 1999

(65) Prior Publication Data

US 2002/0061499 A1 May 23, 2002

(51) Int. Cl.⁷ .............................................. G09B 13/00
(52) U.S. Cl. ....................................... 434/227; 434/231
(58) Field of Search ................................ 434/227, 228, 434/229, 230, 231, 232, 233

(56) References Cited

U.S. PATENT DOCUMENTS

| | | | | |
|---|---|---|---|---|
| 3,225,883 A | * | 12/1965 | Ayres | 434/227 |
| 3,664,036 A | * | 5/1972 | Boswell | 434/227 |
| 3,675,339 A | * | 7/1972 | La Marca | 424/227 |
| 3,751,825 A | * | 8/1973 | Barrett | 434/227 |
| 3,812,277 A | * | 5/1974 | Swartzman | 434/227 |
| 3,895,555 A | | 7/1975 | Peterson et al. | |
| 3,980,823 A | * | 9/1976 | Howard | 178/30 |
| 4,238,984 A | * | 12/1980 | Watanabe | 84/608 |
| 4,253,248 A | * | 3/1981 | Cornish | 434/227 |
| 4,281,579 A | * | 8/1981 | Bennett | 84/478 |
| 4,331,062 A | | 5/1982 | Rogers | |
| 4,378,217 A | * | 3/1983 | Wilson et al. | 434/228 |
| 4,416,182 A | | 11/1983 | Wise et al. | |
| 4,466,798 A | * | 8/1984 | Conroy | 434/118 |
| 4,651,612 A | | 3/1987 | Matsumoto | |
| 4,730,533 A | | 3/1988 | Schoerkmayr | |
| 5,183,398 A | | 2/1993 | Monte et al. | |
| 5,252,772 A | | 10/1993 | Wright | |
| 5,361,672 A | | 11/1994 | Koyama | |
| 5,392,682 A | | 2/1995 | McCartney-Hoy | |
| 5,394,784 A | | 3/1995 | Pierce et al. | |
| 5,419,704 A | | 5/1995 | North | |
| 5,495,786 A | | 3/1996 | Choi | |
| 5,496,963 A | | 3/1996 | Ito | |
| 5,535,421 A | * | 7/1996 | Weinreich | 710/67 |
| 5,538,431 A | * | 7/1996 | Dempster | 434/227 |
| 5,656,789 A | | 8/1997 | Nakada et al. | |
| 5,718,590 A | | 2/1998 | Choate | |
| 5,803,744 A | | 9/1998 | Yen | |
| 5,907,115 A | | 5/1999 | Matsunaga et al. | |
| 5,993,089 A | * | 11/1999 | Burrell, IV | 400/100 |

FOREIGN PATENT DOCUMENTS

| | | |
|---|---|---|
| CA | 478677 | 11/1951 |
| CA | 972952 | 8/1975 |
| FR | 2266241 | 10/1975 |
| JP | 4-116680 A | 4/1992 |

* cited by examiner

*Primary Examiner*—Kurt Fernstrom
(74) *Attorney, Agent, or Firm*—Townsend and Townsend and Crew LLP

(57) ABSTRACT

A system and method for teaching proper hand positioning for using a keyboard. The system includes not allowing a lesson for learning to operate the keyboard to begin until home keys are depressed simultaneously. Additionally, the lesson will be interrupted periodically and will not continue until the home keys are depressed simultaneously.

13 Claims, 2 Drawing Sheets

ELECTRONIC KEYBOARD INSTRUCTOR

BACKGROUND OF THE INVENTION

1. Field of the Invention

The present invention relates to a system and method for teaching proper hand positioning for using a keyboard, and more particularly, to a system and method of teaching proper hand positioning for using a typing keyboard.

2. Description of the Prior Art

Keyboards, such a musical keyboards and typing keyboards, are common items in today's society. Indeed, with the huge number of personal computers that are prevalent in workplaces, homes and schools, typing keyboards are an integral part of everyday life. Hence, proper use of typing keyboards is becoming more and more important for improved efficiency and speed when using computers or generally typing.

Additionally, in today's society, children are using computers at an earlier age and in more and more activities. Currently, there are numerous products available for teaching children, as well as adults, proper keyboard typing skills and techniques. However, in order to maximize typing speed, accuracy and efficiency, the typist's hands and fingers need to be properly positioned.

SUMMARY OF THE INVENTION

The present invention provides a method of teaching proper hand positioning for using a keyboard. The method includes providing a keyboard that includes home keys and providing a lesson for learning to operate the keyboard. The lesson begins once at least two of the home keys are pressed substantially simultaneously. This helps assure that the learning typist has his hands and fingers properly positioned upon commencing the lesson.

In accordance with another embodiment of the present invention, a method of teaching proper hand positioning for using a keyboard includes providing a keyboard that includes home keys and providing a lesson for learning to operate the keyboard. Once the lesson has begun, at least once during the lesson, the student typist is required to depress at least two of the home keys substantially simultaneously in order to continue the lesson. This helps ensure that the learning typist maintains proper central or "home" hand positioning to promote proper finger use during typing.

Other features and advantages of the present invention will be understood upon reading and understanding the detailed description of the preferred exemplary embodiments, found hereinbelow, in conjunction with reference to the drawings, in which like numerals represent like elements.

DETAILED DESCRIPTION OF THE PREFERRED EXEMPLARY EMBODIMENTS

Figure 1:
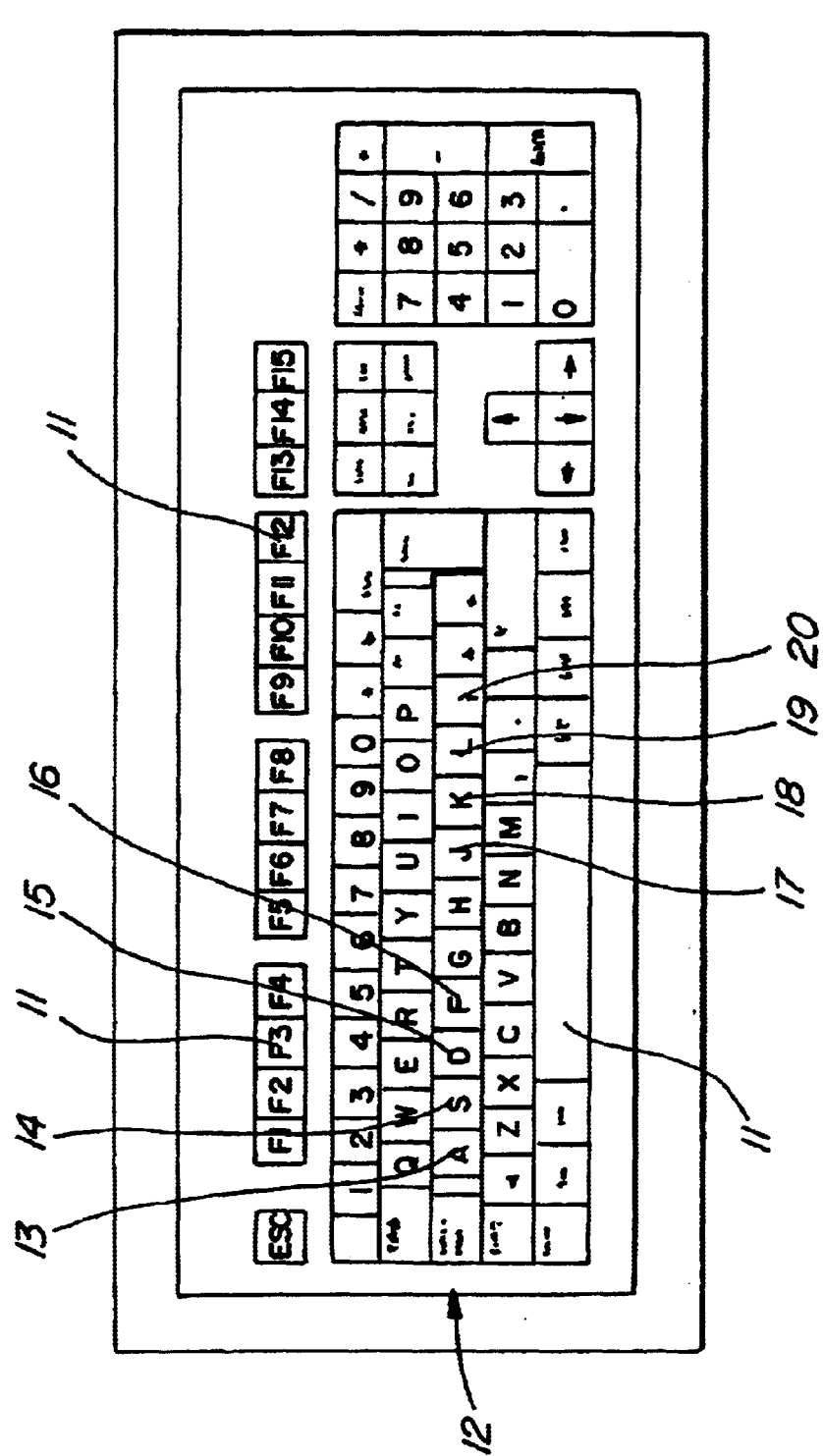
FIG. 1 is a schematic illustration of a typing keyboard.

FIG. 1 illustrates an example of a typing keyboard 10. While the keyboard illustrated is often referred to as a standard typing keyboard, those skilled in the art understand that the keyboard may be shaped and "laid out" differently, such as is common with ergonomic keyboards, but the keys are generally arranged in a very similar order.

Keyboard 10 includes a plurality of keys 11 that are common to typing keyboards. The keys are generally arranged in rows. Row 12 is generally referred to as the home row with keys 13–20 ("A", "S", "D", "F", "J", "K", "L", and ":", respectively) commonly referred to as the home keys. These designations are generally applied because a typist, in order to maximize typing skills, speed and efficiency, generally place their fingers at these keys as "a base position." Typing movements or keystrokes are then performed by moving the fingers from these keys.

Often times, typists' hands will stray from the home row position. As known in the art, when a typist's hands are in the home row position, the fingers are positioned such that the four fingers on the left hand are adjacent keys 13–16 while the four fingers in the right hand are adjacent keys 17–20.

In order to teach typists essential and basic typing skills, as well as to improve their speed, accuracy and efficiency, typing lessons are generally used. These lessons can appear in various forms, such as, for example, on paper, on chalkboards, bulletin boards, or audibly, but preferably are contained within software or on preprogrammed chips.

In accordance with the present invention, a typing lesson will include a "home row reinforcement" feature wherein the lesson will not begin until all eight home row keys are depressed simultaneously. Preferably, a message will appear on a display device associated with a typing instructor system or computer system that includes the typing lesson. The message will preferably state "PRESS ALL HOME ROW KEYS." Once all eight home row keys have been depressed simultaneously, the lesson will begin.

In accordance with a further embodiment of the "home row reinforcement" feature of the present invention, throughout the typing lessons, a signal will be provided to the student that states "PRESS ALL HOME ROW KEYS." The message may appear in a written lesson, audibly, or, in a preferred embodiment, on the display screen of the typing instructor system or computer system. The "PRESS ALL HOME ROW KEYS" interrupts the student's typing lesson. The lesson will not continue until the student has depressed all eight home row keys simultaneously. Once depressed, the student's lesson may continue.

Alternatively, between one and four of keys 13–16 and between one and four of keys 17–20 may be required to be simultaneously depressed in order to begin and/or continue a lesson. The message may then be "PRESS HOME ROW KEYS." Those skilled in the art will realize that other combinations of depressing two or more home keys simultaneously may be desired depending upon the situation, or the definition of the home keys, such as, for example, in other typing lessons, computer lessons or musical lessons.

The frequency of the "PRESS ALL HOME ROW KEYS" requirement may be adjusted as desired. In a preferred embodiment, the message occurs approximately every 35 seconds a lesson.

Figure 2:
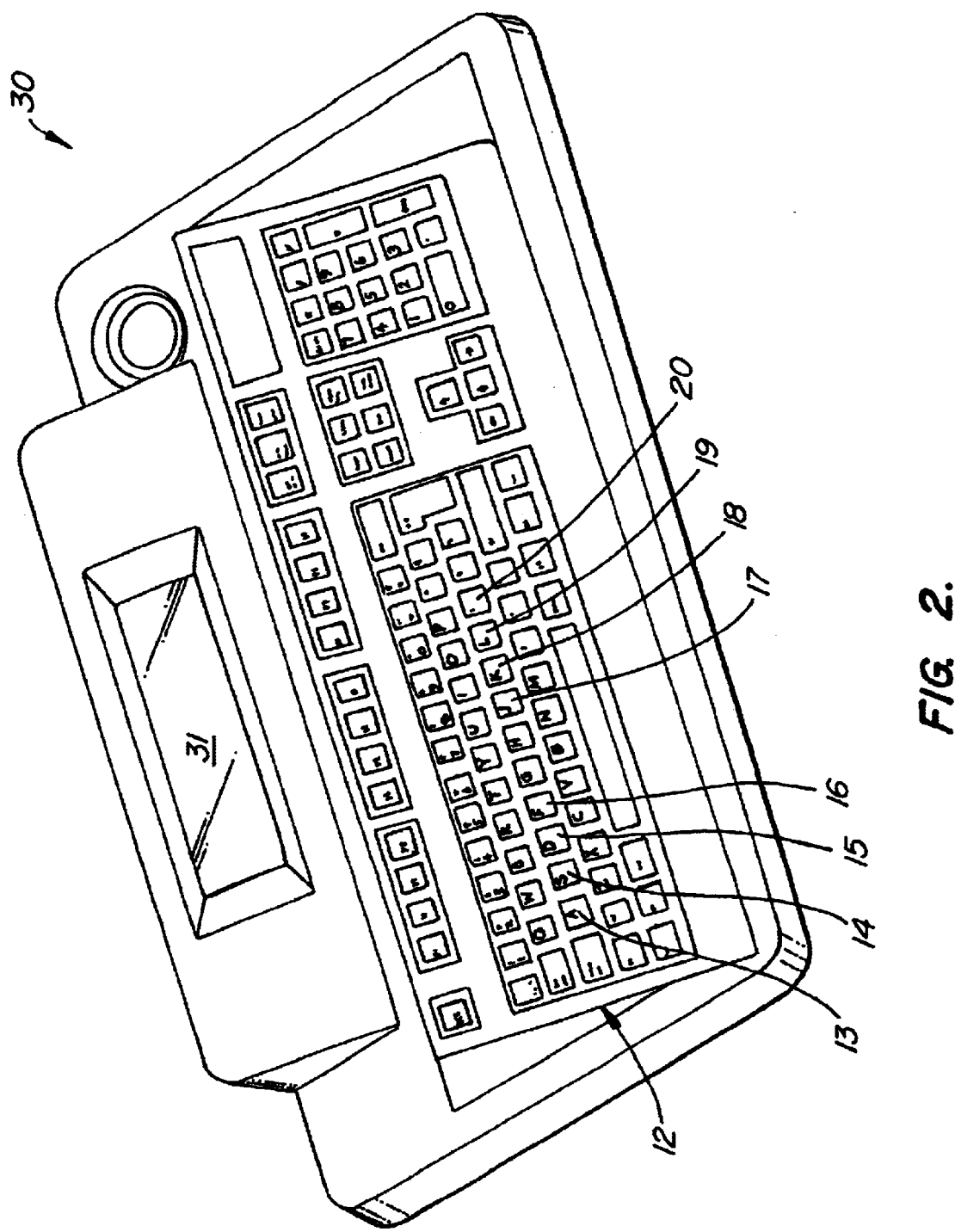
FIG. 2 is a perspective view of a portable electronic keyboard instructor in accordance with the present invention.

FIG. 2 illustrates a typing instructor system or electronic keyboard instructor 30. The keyboard instructor is a small, portable keyboard device. In a preferred embodiment, it is approximately 12 inches long, 8 inches in depth and 2–3 inches in height. It includes a small display 31, which in a preferred embodiment is an LCD display, and is designed to independently instruct students on proper keyboarding or typing skills.

A student may turn the instructor on and open his corresponding work folder contained within the instructor. Thus, the instructor is capable of maintaining multiple work folders corresponding to individual students. Lessons are programmed into the keyboard instructor and are presented to the students, preferably sequentially. In a preferred embodiment, the keyboard instructor includes 60 preprogrammed keyboarding lessons.

Additionally, the keyboard instructor preferably tracks and records the progress of multiple students by name and with corresponding work folders. In a preferred embodiment, the keyboard instructor tracks and records the progress of six students.

Additionally, the keyboard instructor preferably is configured to print a personal keyboarding report for each student to a stand-alone printer (not shown).

The keyboard instructor further preferably includes a special color screening on at least the keys of the keyboard to visually que proper finger placement.

Finally, in a preferred embodiment, each of the preprogrammed keyboarding lessons contained within keyboard instructor 30 include a "home row reinforcement" feature as described above. In other words, in order to begin a lesson, all eight home row keys must be depressed simultaneously. Additionally, throughout the course of each lesson, the lesson will be interrupted and will not continue until all eight home row keys are depressed simultaneously.

The present invention has been described with respect to typing keyboards for typewriters, computers, etc. Those skilled in the art will understand that the present invention is also applicable for musical keyboards to help facilitate proper hand placement and finger use during the playing of the musical keyboard. Furthermore, those skilled in the art will understand that the home keys may be defined differently depending upon the situation, lesson and the keyboard layout.

Although the invention has been described with reference to specific exemplary embodiments, it will be appreciated that it is intended to cover all modifications and equivalents within the scope of the appended claims.

What is claimed is:

1. A method of teaching proper hand positioning for using a typing keyboard, the method comprising:
   providing a keyboard that includes a home row of home keys, wherein the home keys comprise the A, S, D, F, J, K, L, and keys;
   providing a lesson for learning to operate the keyboard, the lesson including a beginning and an end;
   starting the lesson at the beginning by depressing at least two of the home keys substantially simultaneously; and
   requiring depression of at least two of the home keys substantially simultaneously in order to continue performing the lesson at some point between the beginning and the end.

2. A method in accordance with claim 1 wherein the method comprises starting the lesson once at least eight home keys are depressed substantially simultaneously.

3. A method in accordance with claim 1 wherein the requiring of depression of home keys occurs every 35 second.

4. A method in accordance with claim 1 wherein the requiring of depression of home keys comprises instructing a person to depress home keys in order to continue the lesson.

5. A method in accordance with claim 1 wherein the requiring of depression of home keys comprises audibly instructing a person to depress the home keys in order to continue the lesson.

6. A method in accordance with claim 1 further comprising scoring a person for their performance of the lesson, wherein the scoring of the performance includes how quickly the home keys are depressed when required.

7. A system for teaching proper hand positioning for using a keyboard, the system comprising:
   a keyboard that includes a home row of home keys, wherein the home keys comprise the A, S, D, F, J, K, L, and: keys;
   a controller coupled to the keyboard and including at least one programmed lesson for learning to operate the keyboard, the lesson including a beginning and an end; and
   an indicator coupled to the computer;
   wherein the at least one programmed lesson provides for performing at least a portion of the lesson once at least two of the home keys are depressed substantially simultaneously and for activating the indicator to indicate a requirement of depression of at least two of the home keys substantially simultaneously in order to continue with the at least a portion of the lesson at some point between the beginning and the end.

8. A system in accordance with claim 7 wherein the controller is configured to activate the indicator to indicate a requirement of depression of at least eight of the home keys substantially simultaneously.

9. A system in accordance with claim 7 wherein the indicator comprises a video display.

10. A system in accordance with claim 7 wherein the indicator comprises an audio source.

11. A method of teaching proper hand positioning for using a typing keyboard, the method comprising:
    providing a keyboard that includes a home row of home keys, wherein the home keys comprise the A, S, D, F, J, K, L, and: keys;
    providing a lesson for learning to operate the keyboard, the lesson including a beginning and an end;
    performing at least a portion of the lesson; and
    requiring depression of at least two of the home keys substantially simultaneously in order to continue performing the at least a portion of the lesson at some point between the beginning and the end.

12. A method of teaching proper hand positioning for using a typing keyboard, the method comprising:
    providing a keyboard that includes a home row of home keys, wherein the home keys comprise the A, S, D, F, J, K, L, and: keys;
    providing a lesson for learning to operate the keyboard, the lesson including a beginning and an end; and
    starting the lesson at the beginning by depressing at least two of the home keys substantially simultaneously.

13. A method in accordance with claim 12 wherein the method comprises starting the lesson once at least eight home keys are depressed substantially simultaneously.

* * * * *